March 16, 1954 A. M. GOODLOE 2,672,214
FILTER OR STRAINER THIMBLE AND METHOD OF PRODUCING SAME
Filed Nov. 30, 1951 2 Sheets-Sheet 1

INVENTOR.
Alfred M. Goodloe,
BY George D. Richards,
Attorney

March 16, 1954 A. M. GOODLOE 2,672,214
FILTER OR STRAINER THIMBLE AND METHOD OF PRODUCING SAME
Filed Nov. 30, 1951 2 Sheets-Sheet 2
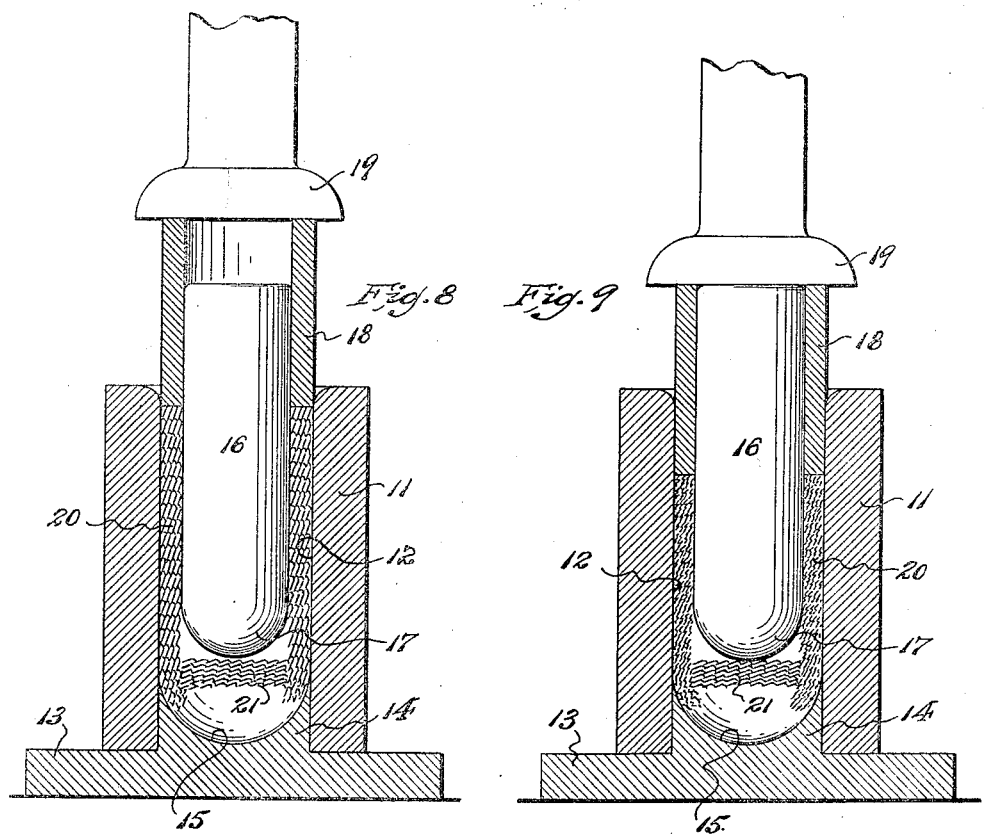
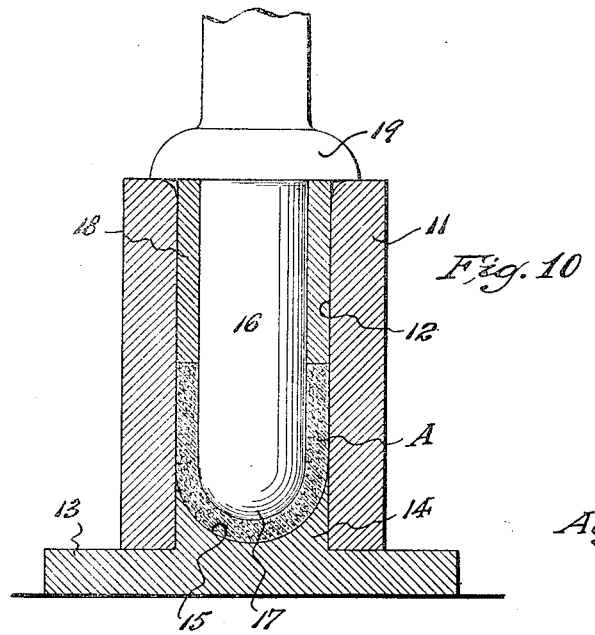
INVENTOR.
Alfred M. Goodloe,
BY George D. Richards,
Attorney Patented Mar. 16, 1954

2,672,214

UNITED STATES PATENT OFFICE 2,672,214

FILTER OR STRAINER THIMBLE AND METHOD OF PRODUCING SAME

Alfred M. Goodloe, Upper Montclair, N. J., assignor to Metal Textile Corporation, Roselle, N. J., a corporation of Delaware Application November 30, 1951, Serial No. 259,160

2 Claims. (Cl. 183—73)

1

This invention relates to a foraminous filter or strainer thimble formed of compressed knitted wire mesh, and to method of producing the same.

Foraminous bodies formed of compressed knitted wire mesh and adapted for various uses, including use as a filter or strainer element for liquid or gas treatment, have heretofore been disclosed in my prior United States Patents 2,439,424 and 2,462,316; and also in United States Patent 2,334,263 granted to Hartwell. The foraminous bodies of these prior patents comprise either tubular cylindrical formations or disc-like bodies either perforate or imperforate. When such foraminous bodies are employed as filter or strainer elements, especially when of tubular cylindrical form, it is necessary to provide specially machined coupling means, soldered connections or connecting parts or the like for attaching the element by one end to a liquid or gas conduit or pipe to be served thereby, as well as to provide added means for closing the opposite or free end thereof, whereby to force the liquid or gas to traverse the foraminous walls of the element without risk of escape or by-passing of solid particles desired to be separated from the treated liquid or gas. Such necessities add considerably to the labor and cost of production and installation of such filter or strainer bodies. Much the same necessities arise in connection with filter or strainer elements made of woven wire cloth or made of sintered metal, with like increase of labor and cost of production and installation.

Considering the above, it is an object of this invention to provide a foraminous filter or strainer body formed from compressed knitted wire mesh in a hollow thimble shape which comprises a unitary or one-piece formation of suitable wall thickness having an open end and a closed opposite or outer end, so that the side and end walls are continuous and of like foraminous structure, thus not only substantially increasing the effective filtering or straining area of the body, but also, by reason of the texture and resiliency of the body wall, permitting the same to thread itself directly upon the end portion of a threaded pipe, nipple or the like in coupled connection therewith, without necessity for use of specially designed or separate coupling connections or parts, or of soldered connections or attachment parts.

The invention has for another object to provide a novel filter or strainer body of the above stated character which can be readily produced in various desired sizes, especially in very small sizes, and of various densities or interstitial size.

The invention has for a further object to provide a novel method for production of a filter or strainer body of the above stated kind and character.

The above and other objects of this invention will be understood from a reading of the following description thereof in connection with the accompanying drawings, in which:

Figs. 8 to 10 are sectional views in part elevation showing successive steps of the method by which the filter or strainer thimble is produced in a forming mold.

Similar characters or reference are employed in the above described views, to indicate corresponding parts.

Figure 1:
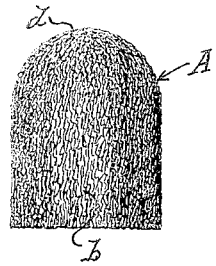
Fig. 1 is a side elevational view of a filter or strainer thimble according to this invention.

Referring first to Figs. 8 to 10 inclusive, the foraminous filter or strainer thimble according to this invention is produced substantially as follows:

The filter or strainer thimble is formed from knitted metallic mesh fabric material. The fabric may be knitted from round or flat wire of a desired metal, and of selected gauge size. The fabric may be either flat or tubular knit, and may be of selected loop size. The gauge size of wire and knit loop size of the fabric may be varied as best suited for production of a thimble body of desired porosity characteristics.

The operations of forming the knitted metallic mesh fabric material into the filter or strainer thimble are carried out in conjunction with suitable molding means by which said material is compressed and shaped. Said molding means comprises a mold block 11 having an axial bore 12. Said mold block is detachably supported upon a base 13, and said base is provided with an upstanding boss 14 adapted to fit and telescope into the mold block bore 12. The end of said boss 14 is shaped to provide a semi-spherical cavity 15, the margins of which merge with the sides of the mold block bore 12, thus providing the mold block with an internal mold chamber which is closed by a rounded bottom end. A floating mandrel 16 is provided for entrance into the mold chamber of the mold block 11. Said mandrel is provided with a rounded lower end 17 to oppose the rounded bottom end of the mold chamber. This rounded lower end 17 is adapted, when the mandrel 16 is fully entered into the mold chamber by completion of its inward stroke, to be brought into spaced parallel relation to the closed rounded bottom end of the mold chamber. Said mandrel 16 is of an external diameter corresponding to the internal diameter of the filter or strainer thimble to be produced. Also provided for entrance into the mold chamber of the mold block 11 is a tubular compression plunger 18 of less length than the length of the mandrel 16; the length of said plunger being predetermined according to the length of filter or strainer thimble to be produced, and proportionately to the length of the mold chamber according to the density to which the filter or strainer thimble body is to be compressed. Said tubular compression plunger 18 is of an external diameter to slidingly engage the wall of the mold block bore 12; is of a wall thickness corresponding to the wall thickness of a filter or strainer thimble to be produced; and of an internal diameter corresponding to the external diameter of the mandrel 16, so as to slidably embrace the latter. The tubular compression plunger 18 and the mandrel 16 are adapted to be forced into the mold chamber of the mold block 11 by a power actuated driving plunger 19.

A suitable length and width of the knitted metallic mesh fabric material is wound around the lower end portion of the floating mandrel 16 to provide a tubular cylindrical formation 20 comprising a plurality of convolved layers of said fabric material. This formation 20 is so disposed upon the floating mandrel 16 that a lower end portion of the formation of appreciable extent projects downwardly beyond the rounded lower end 17 of said mandrel, and so that an upper end portion of the mandrel projects freely above the upper end of said formation. A separate piece of the knitted metallic mesh fabric is folded upon itself or otherwise suitably manipulated to provide a wad or button-like formation 21, which is inserted within the freely projecting lower end portion of the tubular formation 20 so as to underlie the rounded lower end 17 of said mandrel 16.

The floating mandrel 16 with the fabric material related thereto as above described is entered in the mold chamber of the mold block 11 through the upper open end of the latter, whereupon the tubular compression plunger 18 is engaged over the projecting upper end portion of the floating mandrel 16, and so as to engage the upper end of the fabric material formation 20 (see Fig. 8). The compression plunger 18 and the floating mandrel 16 are now ready for operation, whereby to form the fabric material into a filter or strainer thimble according to this invention. Operation of the compression plunger and mandrel is effected by a power actuated down stroke of the driving plunger 19. By its operative down stroke, the driving plunger 19 first engages the tubular compression plunger 18 and forces the same downwardly into the mold chamber of the mold block 11 and along the floating mandrel 16 endwise against the fabric material formation 20. Such initial movement of the compression plunger 18 not only initially collapses the fabric material upon itself and partially compresses the same, but also forces the lower end portion of the fabric material formation 20 against the rounded bottom cavity 15 of the mold chamber, so that such end portion is caused to fold inwardly around the wad or button-like formation 21, whereby to envelop the latter for consolidation therewith. As this initial movement of the compression plunger 18 is completed, the upper end thereof is brought level with the upper end of the floating mandrel 16, so that the latter is then also engaged by the driving plunger 19 (see Fig. 9). Thereafter, as the driving plunger 19 completes its operative stroke, both the compression plunger 18 and the floating mandrel 16 are together forced downwardly into the mold chamber of the mold block 11, thereby exerting final compressing force upon the combined fabric material formations 20 and 21, so as to consolidate the same into a unitary mass which forms a completed filter or strainer thimble A (see Fig. 10).

By the application of compressing force upon the fabric material formation 20 and 21 in the manner above described, the filaments of the wire mesh loops of the fabric material are deformed and interentangled and interlocked together, and the mass thereof compressed and consolidated into a unitary body of self-sustaining hollow thimble shape and of predetermined wall thickness, the walls of which possess a forminated or porous internal structure well adapted to very efficiently perform the desired filtering or straining function. The wire gauge and loop size of the knitted mesh fabric material, together with the degree of compressional force applied to the formations thereof when molding the same into a filter or strainer thimble, may be varied so as to vary the density and thus the porosity or interstitial characteristics of the produced filter or strainer thimble.

In some cases the provision of the wad 21 may be omitted, and the lower freely projecting end portion of the formation 20 can be forced, by the initial stroke of the compression plunger 18, to fill the space between the cavity 15 and the rounded lower end 17 of the mandrel 16; subject thereafter to compression and consolidation, by the combined stroke of said compression plunger 18 and mandrel 16, to form the closed end of the produced filter or strainer thimble.

Figure 2:
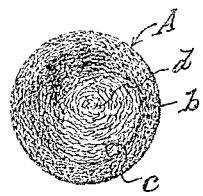
Fig. 2 is a bottom or open end view of the same.
Figure 3:
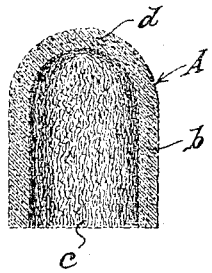
Fig. 3 is a longitudinal sectional view thereof.

As shown in Figs. 1 to 3 inclusive, the novel porous filter or strainer thimble A comprises a hollow cylindrical body *b* having a bottom opening *c* and a dome-like or semi-spherical closed top end *d*. The thimble A is of substantially uniform wall thickness throughout, and said wall thickness is preferably of substantial width, although it may be varied as desired.

Figure 4:
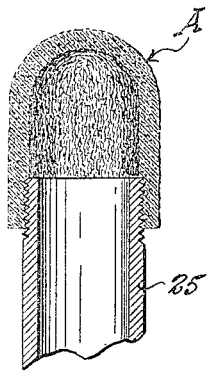
Fig. 4 is a longitudinal sectional view showing the filter or strainer thimble mounted on the end of a threaded pipe to be served thereby in self-attached relation thereto.
Figure 5:
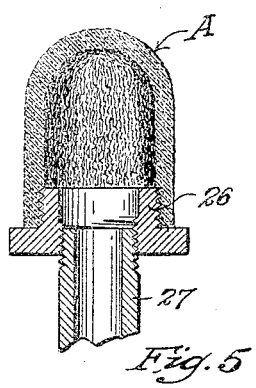
Fig. 5 is a similar view, but showing the filter or strainer thimble mounted on a threaded bushing in self-attached relation thereof, for connection with pipe of smaller diameter than that of the filter or strainer thimble.
Figure 6:
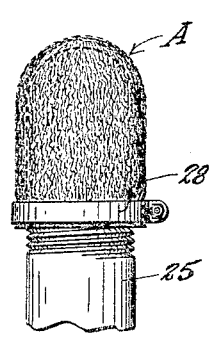
Fig. 6 is a side elevational view of a thin wall type filter or strainer thimble as attached to a pipe to be served thereby, the attached end of said thimble being reenforced by an external clamp band applied thereto.

Owing to the resiliently compressible characteristics of the wall structure of the filter or strainer thimble A, said thimble can be directly attached in self-coupling relation to an externally screw-threaded pipe or like part in connection with which it is to serve. To this end, the filter or strainer thimble A is sized to possess an internal diameter somewhat smaller than the external diameter of the threaded pipe or like part to which it is to be operatively coupled. For example, as shown in Fig. 4, when it is desired to attach the filter or strainer thimble A to the externally screw-threaded end of a liquid or gas conducting pipe 25, the open end c of the thimble is applied to the pipe end and screwed onto the same. The walls of the thimble being resiliently compressible will readily conform to the contours of the pipe thread, so that said pipe thread will press into said walls and form therein corresponding female threads in engagement therewith, thus not only firmly coupling the thimble to the pipe 25, but by the elastic reaction of the thimble walls causing the latter to strongly cling to the pipe in securely hugging attached relation thereto. Such self-coupling function of the filter or strainer thimble is of great advantage, since it eliminates necessity for providing the thimble or the pipe with specifically designed parts or coupling attachments or connections, and thus greatly reduces the labor and cost of production and installation which, as shown in Fig. 5, the filter or strainer thimble A can, in like manner and with like advantage, be attached to a reducer or like bushing 26 with which a liquid or gas conducting pipe 27 of a size smaller or larger than the thimble is provided. In some cases, it may be desirable to employ a filter or strainer thimble A having relatively thin walls. In such case, while the thimble can be threaded onto the pipe 25 as above stated, the walls of the thimble, by reason of their comparative thinness, might possibly be deformed by pressure of liquid or gas caused to traverse the same. If there is risk of such occurrence, the thin walls can be reenforced against deformation by encircling the exterior thereof with a clamp band 28, as shown in Fig. 6. In the above examples, the filter or strainer thimble can serve to filter or strain a fluid drawn into the pipe by suction or discharged from the pipe, as the case may be.

Figure 7:
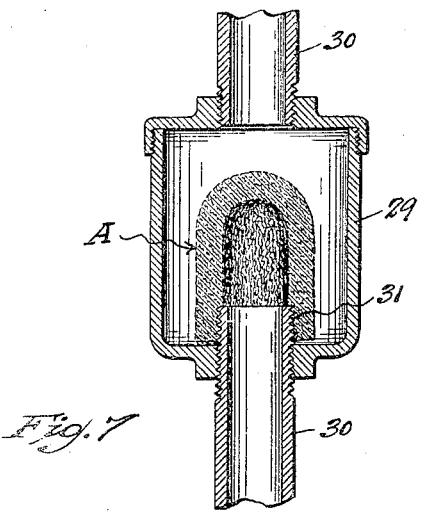
Fig. 7 is a longitudinal sectional view showing one means for mounting the filter or strainer thimble in the line of a liquid or gas conduit.

The filter or strainer thimble may be mounted within a pipe line through which fluid is caused to flow by either pressure or vacuum, so that the flowing fluid is filtered or strained before discharge from the pipe line to a place of use. One example of such installation is shown in Fig. 7, wherein a chamber 29 is connected in the pipe line 30, with an externally screw-threaded end 31 of one pipe section extending into said chamber upon which the filter or strainer thimble is mounted. In such arrangement, the fluid conducted through the pipe line 30 must traverse the porous walls of the thimble with desired filtering or straining effect.

The novel filter or strainer filter can be produced in various sizes, and can be readily produced in very small sizes in the order of one-quarter inch or less in diameter suitable for use involving flow of a small amount of liquid, such e. g. as a volume flow of a few cubic centimeters per minute.

Having now described my invention, I claim:

1. The method of producing a strainer thimble in the form of a hollow body open at one end and closed at the opposite end and having a unitary foraminous wall structure comprising winding a length of knitted wire fabric about a mandrel into a tubular formation with its lower end portion projecting beyond the lower extremity of said mandrel, inserting a wad of like knitted wire fabric within the lower open end of said tubular formation to underlie the lower extremity of the mandrel, disposing this assembly in a mold chamber having a closed bottom end to which said lower end portion of the tubular formation and the contained wad is opposed, opposing the upper end of the tubular formation by a tubular compression plunger sized to slide into the mold chamber and over the mandrel, then first forcing said compression plunger into the mold chamber to initially collapse the convolved plies of the tubular formation edgewise upon themselves while enfolding the lower end portion of the tubular formation about the contained wad, and thereafter simultaneously forcing both the compression plunger and said mandrel completely into the mold chamber, whereby to further compress both the tubular formation and the wad to mutually interentangle and interlock knit loop filaments thereof, while at the same time similarly interentangling and interlocking together contiguous filaments of said tubular formation and wad to thereby join the same so as to form the unitary foraminous wall structure of the thimble.

2. The method of producing a strainer thimble in the form of a hollow body open at one end and closed at the opposite end and having a unitary foraminous wall structure comprising winding a length of knitted wire fabric about a mandrel into a tubular formation with its lower end portion projecting beyond the lower extremity of said mandrel, disposing this assembly in a mold chamber having a closed bottom end to which said lower end portion of the tubular formation is opposed, opposing the upper end of the tubular formation by a tubular compression plunger sized to slide into the mold chamber and over the mandrel, then first forcing said compression plunger into the mold chamber to initially collapse the convolved plies of the tubular formation edgewise upon themselves while forcing the lower end portion of the tubular formation about the lower end of the mandrel, and thereafter simultaneously forcing both the compression plunger and said mandrel completely into the mold chamber, whereby to further compress the tubular formation to mutually interentangle and interlock knit loop filaments thereof, while at the same time similarly interentangling and interlocking together the filaments of said lower end portion of the tubular formation to thereby join the same so as to form the unitary foraminous end wall structure of the thimble.

ALFRED M. GOODLOE.

References Cited in the file of this patent

UNITED STATES PATENTS

| Number | Name | Date |
|---|---|---|
| 1,047,195 | Fries | Dec. 17, 1912 |
| 1,955,354 | Winslow | Apr. 17, 1934 |
| 2,334,263 | Hartwell | Nov. 16, 1943 |
| 2,404,872 | Walker | July 30, 1946 |